US010013887B2

(12) United States Patent
Gillet

(10) Patent No.: US 10,013,887 B2
(45) Date of Patent: Jul. 3, 2018

(54) METHOD AND A DEVICE FOR CALCULATING A SAFE PATH FROM THE CURRENT POSITION OF AN AIRCRAFT TO AN ATTACHMENT POINT

(71) Applicant: AIRBUS HELICOPTERS, Marignane (FR)

(72) Inventor: Marianne Gillet, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 15/358,161

(22) Filed: Nov. 22, 2016

(65) Prior Publication Data
US 2017/0148330 A1 May 25, 2017

(30) Foreign Application Priority Data

Nov. 24, 2015 (FR) ...................... 15 02454

(51) Int. Cl.
*G08G 5/00* (2006.01)
*B64C 27/04* (2006.01)
*B64D 43/00* (2006.01)
*G01C 21/00* (2006.01)

(52) U.S. Cl.
CPC ............ *G08G 5/0034* (2013.01); *B64C 27/04* (2013.01); *B64D 43/00* (2013.01); *G01C 21/00* (2013.01); *G08G 5/0047* (2013.01)

(58) Field of Classification Search
CPC ........ G08G 5/00; G08G 5/003; G08G 5/0039; G08G 5/0086; G01C 21/00; G01C 21/24; G01C 23/00; G01S 13/00; G01S 13/93; G01S 13/94; B64C 27/00; B64D 43/00
See application file for complete search history.

(56) References Cited

U.S. PATENT DOCUMENTS

| 7,346,437 | B2 | 3/2008 | Petillon |
| 7,367,526 | B2 | 5/2008 | Baudry |
| 8,364,330 | B2 | 1/2013 | Filias et al. |
| 8,498,769 | B2 | 7/2013 | Sacle et al. |

(Continued)

FOREIGN PATENT DOCUMENTS

| CN | 104516354 | 4/2015 |
| EP | 1614086 | 1/2006 |

(Continued)

OTHER PUBLICATIONS

French Search Report for French Application No. FR 1502454, Completed by the French Patent Office, dated Oct. 25, 2016, 8 Pages.

*Primary Examiner* — Yonel Beaulieu
(74) *Attorney, Agent, or Firm* — Brooks Kushman P.C.

(57) ABSTRACT

A method and device for calculating a safe path from a current position (P1) of an aircraft to an attachment point (P2) over a terrain. The current position (P1) of the aircraft is determined, and then the attachment point (P2) is defined. At least one attachment path connects he current position (P1) to the attachment point (P2) in safe manner over the terrain. The attachment path may be subdivided into a plurality of tracks (31-39). Each track (31-39) is situated at a safe altitude that is higher than the highest point of the terrain being overflown. In addition, the attachment path may be a return path defined by passage points (S1-S8) of the aircraft.

20 Claims, 4 Drawing Sheets

(56) References Cited

U.S. PATENT DOCUMENTS

| | | | | |
|---|---|---|---|---|
| 8,633,835 B1* | 1/2014 | Spencer, V | ............ | G01C 23/00 |
| | | | | 340/977 |
| 8,798,814 B1* | 8/2014 | Spencer, V | ............ | B64D 43/00 |
| | | | | 244/10 |
| 8,886,369 B2* | 11/2014 | Sharkany | ............... | G01C 23/00 |
| | | | | 701/14 |
| 2009/0234519 A1* | 9/2009 | Hoofd | .................... | G01C 21/00 |
| | | | | 701/4 |
| 2010/0324812 A1* | 12/2010 | Sacle | .................... | G01C 21/00 |
| | | | | 701/467 |
| 2015/0262490 A1* | 9/2015 | Deker | ................. | G08G 5/0052 |
| | | | | 701/3 |

FOREIGN PATENT DOCUMENTS

| | | |
|---|---|---|
| EP | 2267682 | 12/2010 |
| FR | 2847553 | 5/2004 |
| FR | 2874553 | 3/2006 |
| FR | 2928726 | 9/2009 |
| FR | 2945622 | 11/2010 |
| FR | 2947370 | 12/2010 |
| FR | 3017967 | 8/2015 |
| WO | 2004095393 | 11/2004 |

* cited by examiner

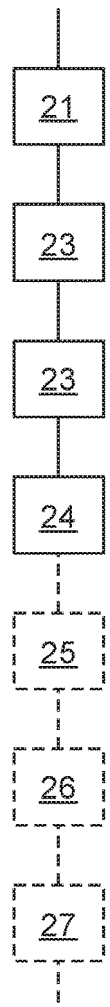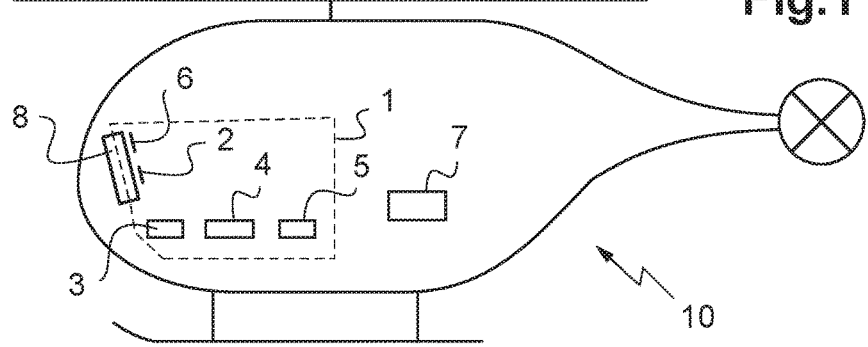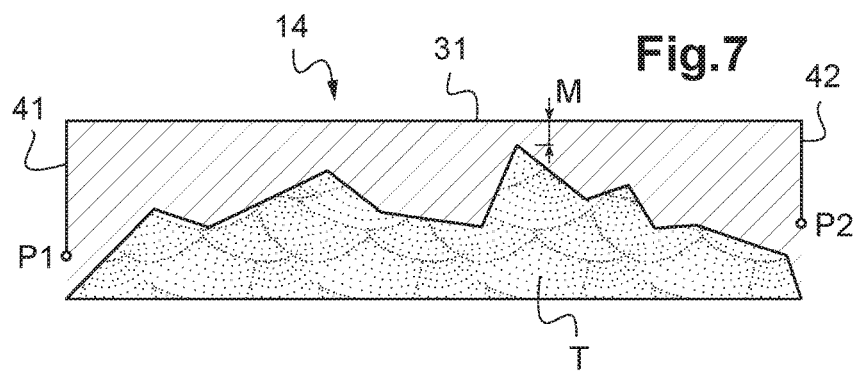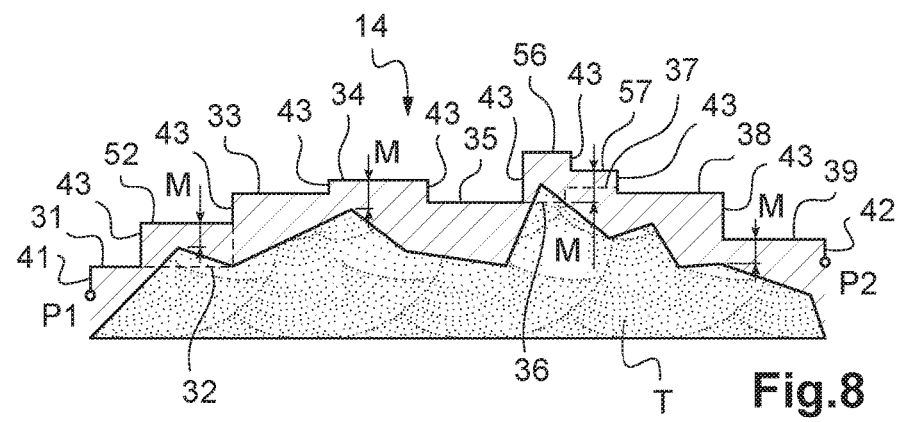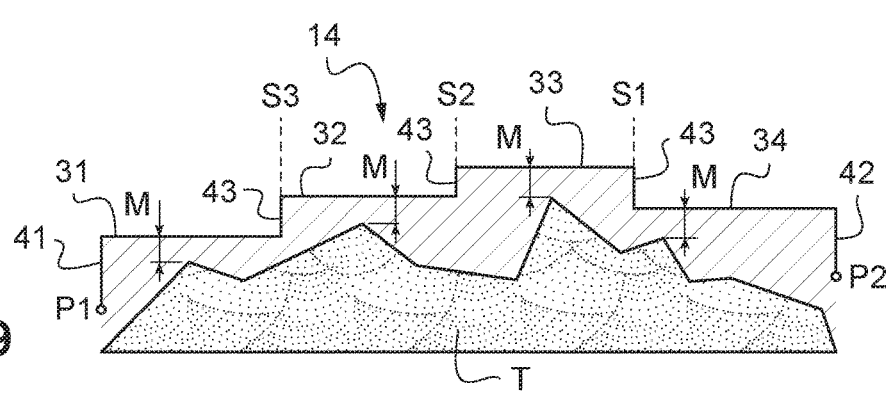

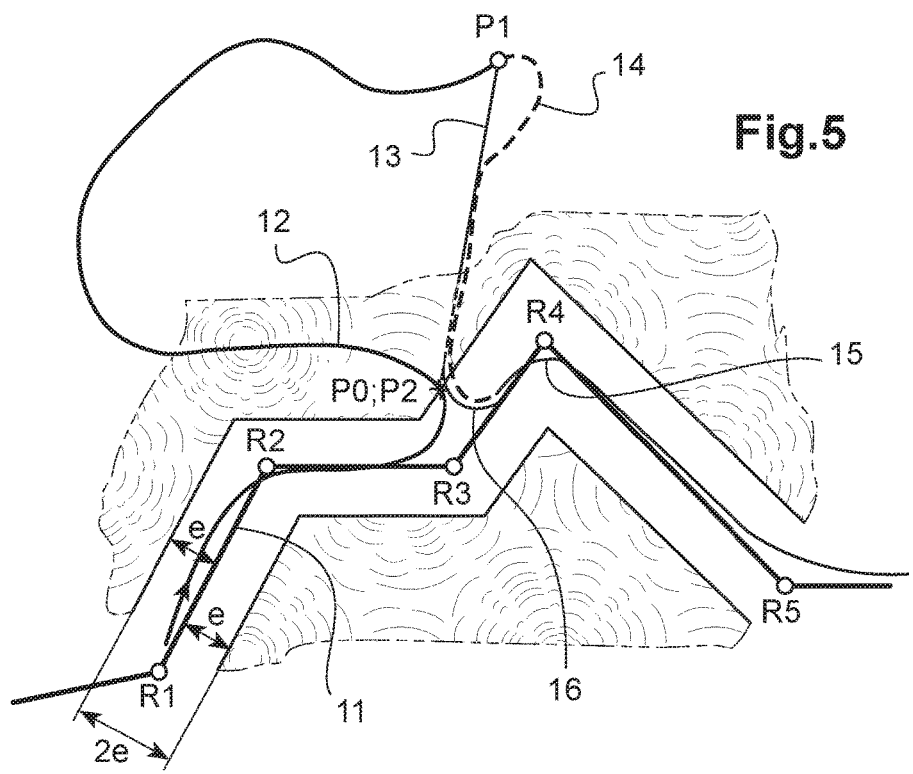
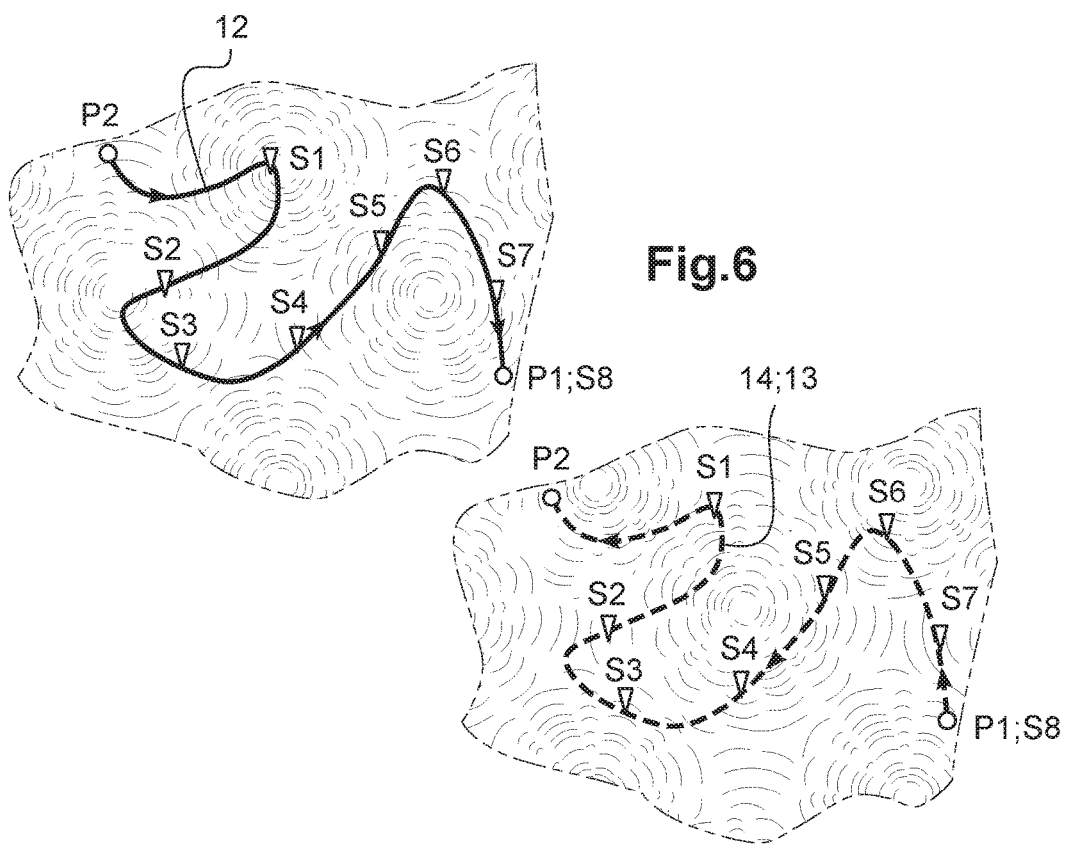

METHOD AND A DEVICE FOR CALCULATING A SAFE PATH FROM THE CURRENT POSITION OF AN AIRCRAFT TO AN ATTACHMENT POINT

CROSS-REFERENCE TO RELATED APPLICATIONS

This application claims the benefit of FR 15 02454 filed on Nov. 24, 2015, the disclosure of which is incorporated in its entirety by reference herein.

BACKGROUND OF THE INVENTION (1) Filed of the Invention

The present invention lies in the field of systems for navigating and managing the flight of an aircraft that covers, among other functions, the functions of preparing a flight plan and of generating a flight path for the aircraft.

The present invention relates to a method of calculating a safe path from the current position of an aircraft to an attachment point, and also to a device for performing the method.

(2) Description of Related Art

It should be observed that the term "flight plan" is used to designate a theoretical route to be followed by an aircraft, which theoretical route joins together a plurality of successive waypoints.

In addition, the term "path" is used to mean the track to be followed by the aircraft in order to follow the flight plan, which track is as close as possible to the theoretical route defined by the flight plan. The path is made safe and takes account of the performance and of the capabilities of the aircraft, and also of the proximity of the terrain and the presence of any obstacles.

Before each flight of an aircraft, the crew of the aircraft generally draws up a flight plan for the entire flight, with an initial route being defined by the flight plan.

Nevertheless, during the flight, the aircraft may be diverted and thus leave the initial route under particular circumstances. For example, the aircraft may be caused to leave its initial route in order to assist people or indeed to load equipment. The return path of the aircraft over the initial route then needs to be planned during a flight while using such equipment as is available to the crew of the aircraft. Furthermore, in the context of military missions, the aircraft may have only a short time in which to rejoin its initial route. The crew then has little time to change target and rejoin the initial route.

Likewise, during reconnaissance missions, the flight plan as prepared has a go flight itinerary from a starting base to a point of entering the reconnaissance zone, and for a return flight itinerary from an exit point from the reconnaissance zone back to base. While overflying the reconnaissance zone, a flight plan may also be established. Nevertheless, such a flight plan may be sparse or even non-existent, due to lack of knowledge about the terrain in that zone. Furthermore, this flight plan concerning overflying the reconnaissance zone may need to be changed during the flight, in particular in the context of military reconnaissance.

Furthermore, in the context of military missions, the path of the aircraft often needs to involve low altitude flight in order to limit detection and vulnerability of the aircraft. Drawing up an accurate flight plan is then essential in order to guarantee that this low altitude path is safe.

Likewise, drawing up an accurate flight plan is particularly advantageous during poor weather conditions that reduce the pilot's visibility.

The navigation systems that are nowadays to be found on board aircraft, and in particular on-board rotary wing aircraft, can enable an aircraft to return to a specified point starting from its current position.

For example, such conventional navigation systems propose a function known as the "direct-to" function, which consists in proposing a path constituted by a single substantially straight track directly connecting the current position of the aircraft to a point that is specified manually by the crew of the aircraft. The path is a path that is plane in two dimensions. This path can be established quickly. However, this path takes no account of the topography of the terrain or of the presence of obstacles. As a result, this "direct-to" function is not safe and is therefore not suitable for all types of terrain, in particular in the presence of a hill, of obstacles, or indeed of mountainous relief.

An improvement to this "direct-to" function consists in constructing a genuine three-dimensional path comprising a substantially straight and horizontal main track connecting a first vertical line passing through the current position of the aircraft to a second vertical line passing through the designated point. The track is positioned at a height relative to the ground that corresponds to the maximum height of the terrain underlying the track, plus a safety margin. The path also has a first track and a last track that are substantially vertical, respectively connecting the current position of the aircraft to the main track and the main track to the designated point.

This improvement has the advantage of proposing a genuine 3D path that is safe relative to the terrain overflown by the aircraft. Nevertheless, this safe 3D path is not optimized. In particular, this safe 3D path allows for relief or obstacles to be passed solely by passing over them, but does not make any proposal for going round them on a horizontal path that might be better suited to the capabilities and the performance of the aircraft or to the discretion that is required for military missions.

Furthermore, aircraft fitted with sophisticated navigation systems have the option of modifying the initial route defined by the flight plan or of creating a new route for the aircraft in accurate manner. Nevertheless, only a horizontal component of the path of the aircraft can be created or modified, since this function is available only in two dimensions. This function also represents a considerable workload for the crew of the aircraft, since there can sometimes be as many as fifty operations to perform. Specifically, a plurality of successive waypoints need to be inserted manually on a map display in order to define the new route for the aircraft. Drawing up this new route thus takes a relatively long time.

Furthermore, Document FR 2 847 553 describes a method that may be considered as an extension of the "direct-to" function when the designated point lies on a predetermined route. Specifically, that method avoids the need for the crew to designate the designated point manually, since it is defined automatically by the method as the point of intersection between extending the current speed vector of the aircraft and the predetermined route. In order to engage the method, the pilot only needs to direct the aircraft in terms of its speed vector to the point where the pilot seeks to return to the predetermined route. The method defines a path having a straight first segment from the current position of the aircraft and a curvilinear second segment constituting a junction between the straight first segment and the initial route. Nevertheless, that path is situated in a horizontal plane that contains the current position of the aircraft and the designated point, and it is therefore not safe and suitable for all types of terrain.

Also known is Document FR 2 928 726, which describes a method of calculating a junction path between an exit point from a primary route and an entry point to a secondary route. The flight path following characteristics such as the speed of the aircraft, its altitude, and its turning capability are different for the primary and secondary routes. That method defines a capture point on the secondary route, upstream from the entry point. The aircraft must have acquired the path-following characteristics for the secondary route by the time it passes through the capture point or close thereto in order to be able to follow the secondary route as it goes through the entry point. The junction path is formed by tracks defined in compliance with the ARINC 424 standard, and for example a track may for example be defined using the "direct-to" function.

In both those documents, the path for rejoining an existing route is defined without taking account of the topography of the terrain or the presence of obstacles. The path therefore cannot be considered as being a safe path.

Furthermore, Document CN 104516354 describes a method of determining return itineraries for a pilot-less helicopter, with three different return itineraries being defined.

Finally, Documents FR 2 947 370 and EP 1 614 086 describe a method of preparing and following a flight plan between two passage points. That method makes it possible in particular to define a path corresponding to the flight plan, while taking account of the topography of the terrain. The path is subdivided into a plurality of horizontal tracks, each track being arranged above the underlying zone of the terrain.

By way of example, according to Document EP 1 614 086, it is verified that each track does not interfere with the terrain, or where applicable an operator is warned so that each interfering track can be modified and positioned at a safe altitude higher than the highest point of the underlying terrain.

According to Document FR 2 947 370, a "sheet-laying" method enables each horizontal track to be arranged directly at a safe altitude. With that path, the aircraft can thus fly as close as possible to the terrain in safe manner without any risk of interference. That path may also be referred to as "terrain flight" or "vertical contour flight".

BRIEF SUMMARY OF THE INVENTION

An object of the present invention is to avoid the above-mentioned limitations and to propose a method and a device suitable for defining quickly and automatically a path that enables the aircraft at any time to reach a previously defined point safely, e.g. a point selected by the crew of the aircraft.

In this context, the invention thus proposes a method of calculating a safe flight path over terrain from the current position of an aircraft to an attachment point, the method comprising the following steps:
  selecting a strategy for choosing the attachment point and for choosing the type of the safe path;
    determining the current position of the aircraft;
    defining the attachment point that is to be reached by the aircraft; and
    defining at least one attachment path connecting the current position of the aircraft to the attachment point in safe manner over the terrain.

This method is for aircraft and in particular for rotary wing aircraft. This type of aircraft includes in particular a man-machine interface MMI, at least one display means, at least one locating means for locating the aircraft, at least one "terrain" and/or obstacles database, and at least one calculator or one computer.

The method of the invention is remarkable in that it makes it possible at any instant to define a path enabling the aircraft to reach a previously defined attachment point safely. For example, the method makes it possible to define a return path for reaching an initial route defined by a flight plan after departing from that route, whether voluntarily or otherwise.

This applies in particular when an aircraft needs to be diverted and to leave its initial route in order to take on board in impromptu manner personnel or indeed equipment. Likewise, during reconnaissance missions, the flight plan of the aircraft may be made up solely of itineraries for the go flight and for the return flight, between a starting base and the reconnaissance zone, but without any flight plan for flight over the reconnaissance zone.

This method thus makes it possible, automatically, to calculate an attachment path, both in the horizontal plane and in the vertical plane connecting the current position of the aircraft to the attachment point. Advantageously, this attachment path is defined in a manner that is safe relative to the terrain being overflown, thus avoiding any risk of collision with relief or indeed with an obstacle. As a result, the method of the invention enables the aircraft to follow the attachment path, including during bad weather conditions that degrade the visibility of the pilot of the aircraft.

Furthermore, this attachment path, as defined automatically, is generated quickly and is thus particularly suitable for military missions, for reconnaissance or evacuating troops for example, in order to leave a potentially hostile zone quickly even though no flight plan has previously been drawn up. Furthermore, the crew of the aircraft can then concentrate on the tactical environment of the flight and the mission.

The current position of the aircraft is determined by locating means present in the aircraft. By way of example, the locating means may be a receiver for receiving signals transmitted by satellites of the global navigation satellite system (GNSS) type. Such a GNSS receiver may also be coupled to an inertial unit in order to improve the availability and the integrity of this current position for the aircraft.

Advantageously, the method of the invention makes various strategies possible for choosing the attachment point and for choosing the type of attachment path to be calculated. The crew of the aircraft, and in particular the pilot, can select the strategy at any time, i.e. both while preparing a flight and also during the flight, at the moment when the pilot desires to engage the method of calculating a safe path. By way of example, the pilot makes use of a man-machine interface MMI in order to select a particular strategy from a list of predefined strategies.

In a first strategy, the attachment point is defined directly by its coordinates in a terrestrial reference frame. The pilot may supply the coordinates of the attachment point by using the man-machine interface MMI beforehand, either while preparing the flight or else during the flight, or indeed at the moment of engaging the method of calculating the attachment path.

In a second strategy, the attachment point is defined directly during the flight of the aircraft as being the point over which the aircraft is flying. The pilot then defines this attachment point by selecting it using the man-machine interface MMI as the aircraft overflies the point.

When a flight plan has previously been prepared and an initial route is defined by the flight plan, the attachment point may also be defined using the following strategies.

Thus, in a third strategy, the attachment point is defined as a first characteristic point belonging to the initial route. For example, the attachment point may be defined by the pilot while preparing a reconnaissance flight. By way of example, the first characteristic point may be predetermined and may be formed by an exit point from the reconnaissance zone and situated on the initial route.

This first characteristic point may also be defined automatically by the method of the invention during the flight and it may be situated on the initial route defined by the flight plan of the aircraft. Since the initial route is characterized by its succession of waypoints, the first characteristic point may be formed by the waypoint situated on the initial route downstream from the point where the aircraft departed from the initial route.

This first characteristic point may also be defined automatically by the method of the invention and may be formed by the point of intersection between the initial route and a direction defined by the current speed vector of the aircraft, e.g. at the moment when the method is engaged or indeed at the moment when the pilot seeks to define the attachment point.

This may apply in particular when the aircraft has departed from the initial route in order to avoid a zone of turbulence and the crew seeks to rejoin the initial route.

In a fourth strategy, the attachment point is defined by a second characteristic point that does not belong to the initial route. For example, the pilot may be called on to depart from the initial route in order to pick up personnel or indeed equipment that is off the initial route and that is located at the second characteristic point. The pilot may also be called on to depart from the initial route as a result of a change of mission, e.g. in order to rejoin an auxiliary route defined by an auxiliary flight plan. The second characteristic point is then generally defined by the pilot during the flight by using the man-machine interface MMI.

In a fifth strategy, the attachment point is defined automatically by a third characteristic point formed by a position of the aircraft once it has departed from the initial route by a predetermined distance. Specifically, the pilot may leave the initial route for various reasons. It is considered that the aircraft has departed from its initial route when it is at some predetermined distance therefrom, e.g. a distance lying in the range 500 meters (m) to 800 m. The method of the invention makes it possible to return to the initial route substantially at the location where the aircraft departed from the initial route.

Independently of the strategy used for defining the attachment point, various types of attachment path can be calculated by the method of the invention.

Firstly, attachment path may be defined as a path having a substantially straight and horizontal track situated at a safe altitude and connecting a first vertical line passing through the current position of the aircraft to a second vertical line passing through the attachment point. The attachment path also includes two substantially vertical junctions interconnecting the substantially straight and horizontal track with the current position of the aircraft and with the attachment point respectively. The attachment path is thus defined as an extension to the "direct-to" function.

The safe altitude of a track is a height relative to the ground corresponding to the maximum height of the terrain situated under the track plus a safety margin. The method of the invention uses at least one "terrain" and/or obstacles database present in the aircraft in order to take account of the relief of the terrain and of any obstacles in order to define this maximum height of the terrain and thus make the attachment path safe. This safety margin guarantees that the aircraft flies above the relief, or the obstacles if any, without any risk of collision. By way of example, the safety margin may be equal to 500 feet (ft).

The attachment path may also be defined as being a path made up of a plurality of substantially rectilinear horizontal tracks that are adjacent in pairs. These tracks thus enable a first vertical line passing through the current position of the aircraft to be connected to a second vertical line passing through the attachment point. Each track is situated at a safe altitude that may be different from the safe altitude of any other track. The attachment path also includes substantially vertical junctions. A first junction is a segment of the first vertical line connecting the current position of the aircraft to a first substantially straight and horizontal track. A last junction is a segment of the second vertical line and it connects a last substantially straight and horizontal track to the attachment point. The attachment path also includes substantially vertical intermediate junctions interconnecting pairs of adjacent tracks.

Furthermore, the attachment point may be defined as being a waypoint forming part of an initial route defined by a flight plan. The attachment path may then be defined as a path having a straight first segment in a direction connecting a first vertical line passing through the current position of the aircraft and a second vertical line passing through the attachment point, followed by a curvilinear second segment making the junction between connecting the straight first segment and the initial route. The curvilinear second segment makes it possible to leave the straight first segment while maintaining continuity therewith, i.e. the second segment is tangential to the straight first segment. Likewise, the curvilinear second segment serves to rejoin the initial route while maintaining continuity therewith, i.e. the second segment is tangential to the initial route. Such a path is described in particular in Document FR 2 874 553.

Finally, for this attachment path to be safe, the straight first segment and the curvilinear second segment are positioned at a safe altitude.

Firstly, it is possible to position the straight first segment and the curvilinear second segment at the same safe altitude. This safe altitude is then equal to the maximum height of the terrain situated under the straight first segment and under the curvilinear second segment plus the safety margin.

Alternatively, it is possible to subdivide the straight first segment and the curvilinear second segment into a plurality of horizontal tracks, each track being arranged over the underlying terrain.

It is then possible to verify that each track does not interfere with the terrain by using the terrain and/or obstacles database and by taking account of the safety margin. If there is any interference, then each interfering track is automatically corrected by being placed at a safe altitude. If there is any interference, it is also possible to warn the crew of the aircraft so that the crew corrects each interfering track by positioning it at a safe altitude. Such a method of making a path safe is mentioned in particular in Document EP 1 614 086.

After subdividing the straight first segment and the curvilinear second segment into a plurality of horizontal tracks, it is also possible to arrange each horizontal track directly at a safe altitude. Such a method of making the track safe is described in particular in Document FR 2 947 370.

Finally, the attachment path may include a plurality of substantially vertical junctions. A first junction connects the current position of the aircraft to the first rectilinear segment and a last junction connects the second segment to the initial route. Furthermore, substantially vertical intermediate junctions interconnect pairs of attachment tracks.

Thus, by means of this subdivision of the straight first segment and of the curvilinear second segment into a plurality of horizontal tracks, the attachment path makes it possible to fly as close as possible to the terrain in safe manner and without risk of interference with the terrain or an obstacle. This attachment path thus corresponds to a terrain flight.

Furthermore, when the attachment point is defined by a point over which the aircraft is flying, it is possible during the flight of the aircraft and after it has overflown the attachment point to store a succession of passage points over which the aircraft flies. These passage points may be stored at intervals that are regular in terms of distance traveled or in terms of duration, with it thus being possible for the passage points to be stored automatically. The duration of flight between storing each passage point may thus for example be about 5 minutes (min) for military flights in hostile terrain and about 10 min for civilian flights. The current position of the aircraft is stored as the latest passage point on engaging calculation of the attachment path.

These passage points may also be selected at irregular intervals by the pilot or some other member of the crew of the aircraft. The workload on the crew member performing this recording of passage points can then be considerable, but this can advantageously make it possible to select characteristic points of the path followed by the aircraft as passage points. The passage points are then stored in real time, e.g. by the crew member acting manually on a button of the man-machine interface MMI.

The attachment path is then defined as a path passing successively through each of the passage points in reverse order. The attachment path thus begins at the current position of the aircraft and terminates at the attachment point. The attachment path thus constitutes a return flight for the aircraft following a path that is close to the go flight and may be referred to as a "Hansel and Gretel" flight.

Nevertheless, although this attachment path is formed by a return flight, the attachment path is not safe. Specifically, an obstacle may lie between two passage points or indeed the relief of the terrain between two passage points may be situated at an altitude higher than the altitude of each of the passage points. This danger is due essentially to the time interval between storing two successive passage points. Once more, the method of the invention advantageously makes it possible to make this attachment path safe.

As above, it is possible to position the whole attachment path at a safe altitude. The safe altitude is then equal to the maximum height of the terrain situated under the attachment path plus the safety margin.

Preferably, the attachment path is subdivided into a plurality of horizontal tracks, each track being arranged above the underlying zone of the terrain. Thereafter, either it is verified that each track does not interfere with the terrain by using the terrain and/or obstacles database while taking account of the safety margin, with any interfering track being corrected automatically by being positioned at a safe altitude, or else each horizontal track is arranged directly at a safe altitude. This obtains an attachment path that corresponds to a terrain flight.

Thus, the attachment path makes it possible to follow the terrain in safe manner without any risk of collision when returning to the attachment point in a manner substantially identical to the go flight.

Advantageously, the type of the attachment path calculated by the method of the invention can thus be adapted to the circumstances and the conditions of the flight. In particular, in the context of military missions in a hostile zone, the attachment path must give precedence to low altitude flight in order to limit detection and vulnerability of the aircraft. It is then essential to establish an accurate attachment path in order to guarantee safe flight at low altitude.

Furthermore, the strategy for choosing the type of safe path may be to define a single attachment path for use in rejoining the attachment point.

Nevertheless, the strategy for choosing the type of the safe path may also be to define at least two attachment paths from the various possible attachment paths with a pilot of the aircraft subsequently selecting one of the attachment paths in order to rejoin the attachment point.

Furthermore, in order to inform the pilot of the aircraft about the attachment point at each attachment path, it is possible to display the attachment point and each of the attachment paths on display means of the aircraft, e.g. a map display of the zone being overflown. Such display means may be constituted by a screen situated on the instrument panel of the aircraft or by a tablet.

If the strategy for choosing the type of safe path is to define at least two attachment paths, all of the defined attachment paths are displayed on the display means of the aircraft so as to allow the pilot to select the attachment path that it is to be used for rejoining the attachment point.

Furthermore, when the aircraft has an autopilot, it is possible in the method to guide the aircraft along the attachment path to the attachment point automatically by using the autopilot.

Furthermore, the method of the invention may also make use of an aircraft performance database included in the aircraft. Thus, the attachment path may be defined while verifying that the path is compatible with the performance and the capabilities of the aircraft. This applies in particular when the attachment path is a terrain flight following the relief of the terrain as closely as possible at a safe altitude.

The present invention also provides a device for calculating a safe path from the current position of an aircraft to an attachment point above terrain, the device comprising:
- a man-machine interface MMI;
- at least one display means;
- at least one locating means for locating the aircraft;
- at least one "terrain" and/or obstacles database; and
- at least one calculator or one computer.

The device for calculating a safe path from the current position of an aircraft to an attachment point over a terrain thus enables the above-described method to be performed.

BRIEF DESCRIPTION OF THE SEVERAL VIEWS OF THE DRAWINGS

The invention and its advantages appear in greater detail from the context of the following description of implementations given by way of illustration and with reference to the accompanying figures, in which:

FIG. 1 shows an aircraft having a device for calculating a safe first path over terrain;

FIG. 2 is a block diagram summarizing a method of calculating a safe first path over terrain;

FIGS. 3 to 6 show various strategies for choosing the attachment point and the type of attachment path;

FIGS. 7 to 9 show various methods of making the attachment path safe; and

Figure 3:
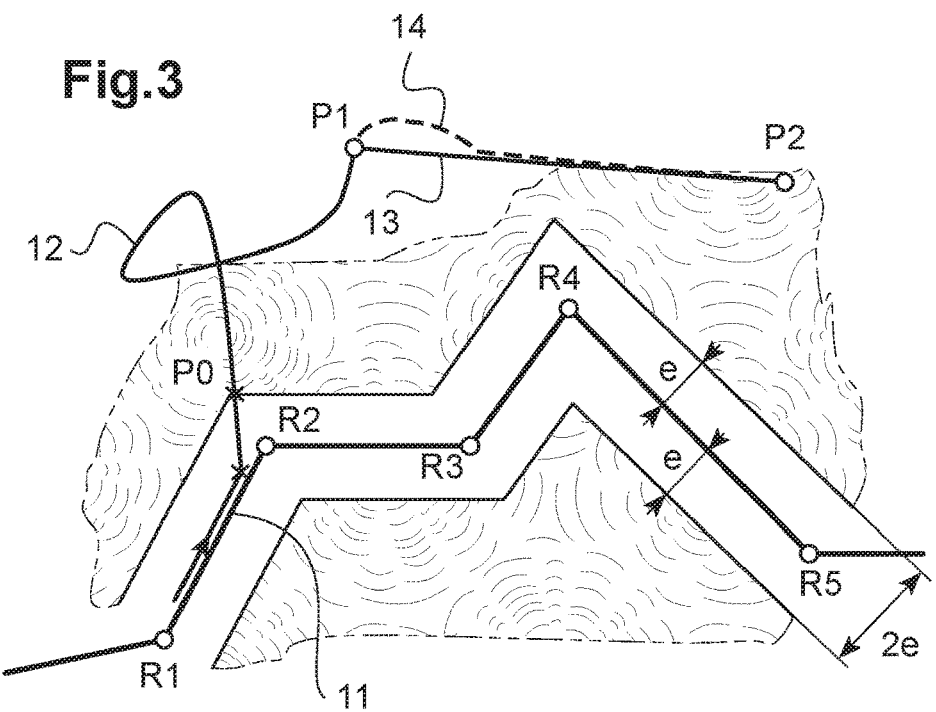

Elements present in more than one of the figures are given the same references in each of them.

DETAILED DESCRIPTION

FIG. 1 shows a rotary wing aircraft 10 having a device 1 for calculating a safe path for flying over terrain, an instrument panel 8, and an autopilot 7. The device 1 includes a man-machine interface MMI 2, display means 6, locating means 5 for locating the aircraft 10, a database 4 containing "terrain" and/or obstacles, and a calculator 3.

FIG. 2 is a block diagram summarizing a method of calculating a safe path for flying over terrain from the current position P1 of an aircraft 10 to an attachment point P2. The method comprises four main steps 21-24 that can be performed by the device 1 for calculating a safe path for flight over terrain.

During a first step 21, a strategy is selected for choosing the attachment point P2 and the type of safe path. This choice is performed by the crew of the aircraft 10, e.g. the pilot, using the man-machine interface MMI 2. This choice may be made at any instant, both while preparing a flight and while in flight.

Examples of various possible strategies for choosing the attachment point P2 and the type of safe path are shown in detail in FIGS. 3 to 6.

During a second step 22, the current position P1 of the aircraft 10 is determined. This current position P1 of the aircraft 10 is determined by the locating means 5 of the aircraft 10, at the time when calculating the attachment path 14 is started. The locating means 5 may for example be a satellite signal receiver of the global navigation satellite system (GNSS) type.

During a third step 23, the attachment point P2 that is to be reached by the aircraft 10 is defined by applying the strategy for choosing this attachment point P2 as selected during the first step 21.

During a fourth step 24, at least one attachment path 14 is defined by the calculator 3. This attachment path 14 connects the current position P1 of the aircraft 10 to the attachment point P2 in a manner that is at a safe height above the terrain by applying the particular strategy for choosing the type of safe path that was selected during the first step 21.

FIGS. 3 to 6 show examples of strategies for choosing the attachment point P2 and for choosing the type of safe path.

Figure 4:
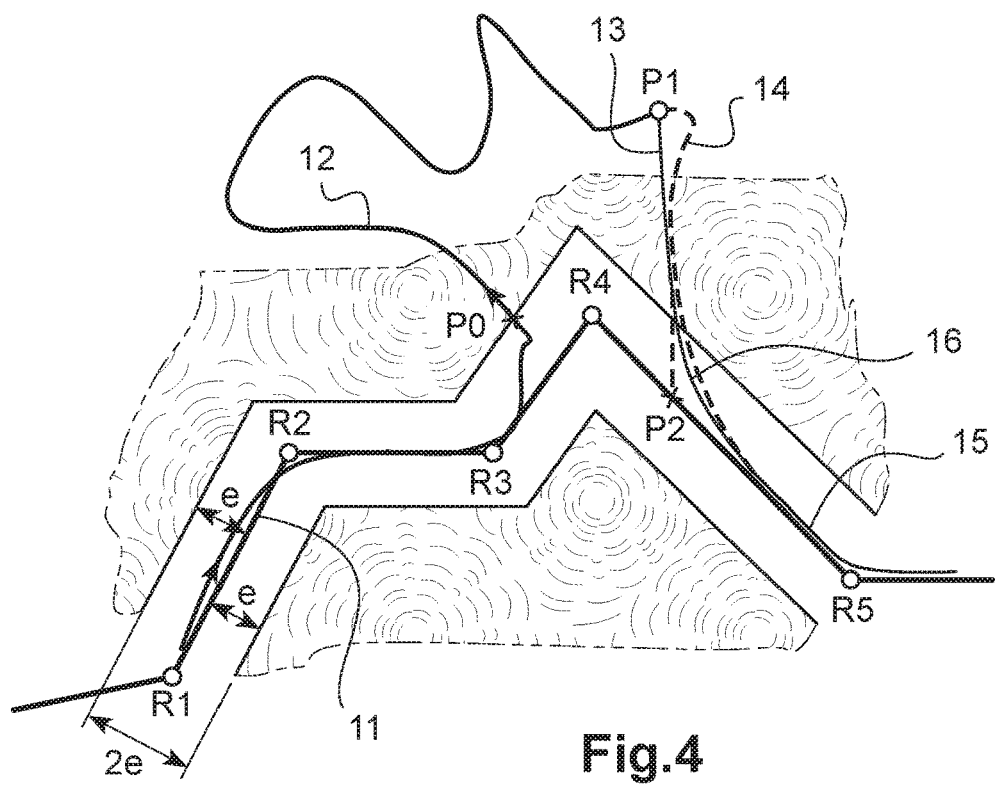

In FIGS. 3 to 5, an initial route 11 is shown. This initial route 11 is defined by a flight plan that was established by the crew of the aircraft 10 prior to the flight of the aircraft 10. This initial route 11 is characterized by waypoints R1-R5 that are connected together by straight segments.

This initial route 11 is situated in a channel of width 2e and is centered in the channel. Thus, it is assumed that the aircraft 10 follows this initial route 11 so long as it is flying inside the channel. As a result, as soon as the aircraft 10 departs laterally from the initial route 11 by a distance greater than a predetermined value equal to e, it is considered that the aircraft 10 is no longer following this initial route 11.

In FIGS. 3 to 5, the aircraft 10 is following a flight path 12 and it leaves the initial route 11 at a route exit point P0.

In addition, at the time calculation of the attachment path is engaged, the aircraft 10 is situated at the current position P1 forming part of the flight path 12.

In FIG. 3, it can be seen that the attachment point P2 lies outside the initial route 11. This attachment point P2 is defined directly by its coordinates in a terrestrial reference frame. These coordinates are supplied by the crew of the aircraft 10, using the man-machine interface MMI 2 either while preparing the flight, or indeed during the flight.

The attachment path 14 is defined using a straight segment 13 connecting the current position P1 to the attachment point P2 using the "direct-to" function. As a result, starting from the current point P1, the attachment path 14 runs on from the flight path 12. The attachment path 14 is thus defined as extending the current speed vector of the aircraft 10 and subsequently includes a turn for quickly joining the straight segment 13, and it terminates at the attachment point P2.

In FIG. 4, the attachment point P2 forms part of the initial route 11 and it is situated between two waypoints R4 and R5. This attachment point P2 could equally well be one of the waypoints R1-R5 on the initial route 11. This attachment point P2 may be defined by the pilot, for example.

The attachment path 14 is defined by a straight first segment 13 along the direction going from the current position P1 to the attachment point P2. Furthermore, in order to ensure continuity between the attachment path 14 and the initial route 11 that is to be followed by the aircraft 10, this attachment path 14 is also defined by a curvilinear second segment 16 joining the straight first segment 13 to the initial route 11.

As above, starting from the current position P1, the attachment path 14 runs on from the flight path 12 and comprises a turn for quickly joining the straight first segment 13. Thereafter, the attachment path 14 coincides substantially with the curvilinear second segment 16 until it reaches the initial route 11. Under such circumstances, it can be seen that the aircraft 10 does not pass exactly via the attachment point P2.

Furthermore, the attachment point P2 may also be formed by a waypoint forming part of the initial route 11. For example, the attachment point P2 may be defined automatically and may be formed by the waypoint R4 situated on the initial route 11 downstream from the route exit point PO where the aircraft 10 left the initial route 11. The attachment path 14 is then defined by a straight first segment 13 and by a curvilinear second segment 16 in a manner analogous to FIG. 4.

In FIG. 5, the attachment point P2 is formed by the route exit point P0. This attachment point 14 is defined automatically as soon as the aircraft 10 leaves its initial route 11, thus enabling the crew to bring the aircraft 10 back to the vicinity of this route exit point PO before carrying on with the initial route 11 when engaging the calculation of the attachment path 14. As above, the attachment path 14 is defined by a straight first segment 13 along the direction going from the current position P1 to the attachment point P2, and by a curvilinear second segment 16 joining the straight first segment 13 to the initial route 11.

In FIG. 6, the aircraft 10 does not follow an initial route 11. The attachment point P2 is a passage point of the aircraft 10 as defined directly during the flight of the aircraft 10 along the flight path 12. The crew of the aircraft 10 defines this attachment point P2 by selecting it using the man-machine interface MMI 2 while the point is being overflown by the aircraft 10.

Thereafter, passage points S1-S8 of the flight path 12 overflown by the aircraft 10 are stored in succession at regular intervals during the flight of the aircraft 10. The current position P1 of the aircraft 10 is stored as the most recent passage point S8 of the flight path 12 at the time the calculation of the attachment path is started.

The attachment path 14 is then defined as a path that passes in succession and in the reverse order via each of the passage points S1-S8. This attachment path 14 thus begins at the current position P1 and terminates at the attachment point P2. This attachment path 14 thus constitutes a return flight for the aircraft 10 along a path that is close to the go flight in order to return to the attachment point P2.

Furthermore, these passage points S1-S8 of the flight path 12 overflown by the aircraft 10 may advantageously be chosen by a member of the crew of the aircraft 10 during the flight and they may be stored in real time. For example, a passage point S1-S8 is stored when a crew member actuates a dedicated button of the man-machine interface MMI 2.

Independently of the type of attachment path 14 that is calculated, it is necessary for this attachment path 14 to be safe so that the flight along this attachment path 14 is safe, in particular relative to the terrain being overflown. Three methods for making this attachment path 14 safe are shown in FIGS. 7 to 9, using the terrain and/or obstacles database 4.

Initially, as shown in FIG. 7, the attachment path 14 has a horizontal track 31 located at a safe altitude. This safe altitude is then equal to the maximum height of the terrain T lying under the attachment path 14 plus a safety margin M. The attachment path 14 also has two substantially vertical junctions 41 and 42. A first junction 41 connects the current position P1 of the aircraft 10 to the track 31, and a second junction 42 connects the track 31 to the attachment point P2.

Thereafter, as shown in FIG. 8, the attachment path 14 has a plurality of horizontal tracks 31-39. Each track 31-39 is arranged over the underlying terrain T. The method of calculating a safe flight path over a terrain then makes it possible to ensure that each track 31-39 does not interfere with the terrain T by using the terrain and/or obstacles database 4 and by taking the safety margin M into account. It can be seen in particular that the tracks 32 and 36 interfere with the terrain T. Furthermore, the track 37 does not interfere with the terrain T but it does not comply with the safety margin M. Specifically, the three tracks 32, 36, and 37 are replaced by new tracks 52, 56, and 57 that are positioned above the terrain T with the safety margin M.

The attachment path 14 also has substantially vertical junctions 41, 42, and 43. A first junction 41 connects the current position P1 of the aircraft 10 to the first track 31 and a second junction 42 connects the last track 39 to the attachment point P2. Furthermore, intermediate junctions 43 connect together the adjacent tracks 31, 52, 33, 34, 35, 56, 57, 38, and 39 in pairs.

The attachment path 14 shown in FIG. 8 corresponds in particular to a terrain flight enabling the aircraft 10 to fly as close as possible to the terrain in safe manner and without risk of interference.

In addition, as shown in FIG. 9, the attachment path 14 also has a plurality of horizontal tracks 31-34. Each track 31-34 is arranged directly over the underlying terrain T at a safe altitude, i.e. incorporating the safety margin M. Thus, all of the tracks 31-34 of the attachment path 14 are defined without risk of interference with the terrain T.

The attachment path 14 also has substantially vertical junctions 41, 42, and 43. A first junction 41 connects the current position P1 of the aircraft 10 to the first track 31 and a second junction 42 connects the last track 34 to the attachment point P2. In addition, intermediate junctions 43 interconnect adjacent tracks 31-34 in pairs.

The attachment path 14 shown in FIG. 9 corresponds in particular to a "Hansel-and-Gretel" flight starting from the current position P1 of the aircraft 10 and passing in succession via the passage points S3, S2, and S1, terminating at the attachment point P2.

Furthermore, in these three methods of making safe, it should be observed that for an attachment path 14 as shown in FIGS. 4 and 5, the second junction 42 connects the last track not to the attachment point P1 but to the initial route 11 at the intersection between the curvilinear second segment 16 and the initial route 11.

Thus, by subdividing the attachment path 14 into a plurality of horizontal tracks in this way, the aircraft 10 can fly at low altitude as close as possible to the terrain T in a manner that is safe and without risk of interference with the terrain T or with an obstacle.

Furthermore, the method may include a fifth step 25 during which the attachment point P2 is displayed together with each defined attachment path on the display means 6 of the aircraft 10.

If the strategy for choosing the type of safe path is to define a single attachment path from among the various possible attachment paths, then the attachment path is displayed on the display means 6 in order to inform the pilot of the aircraft 10.

Figure 10:
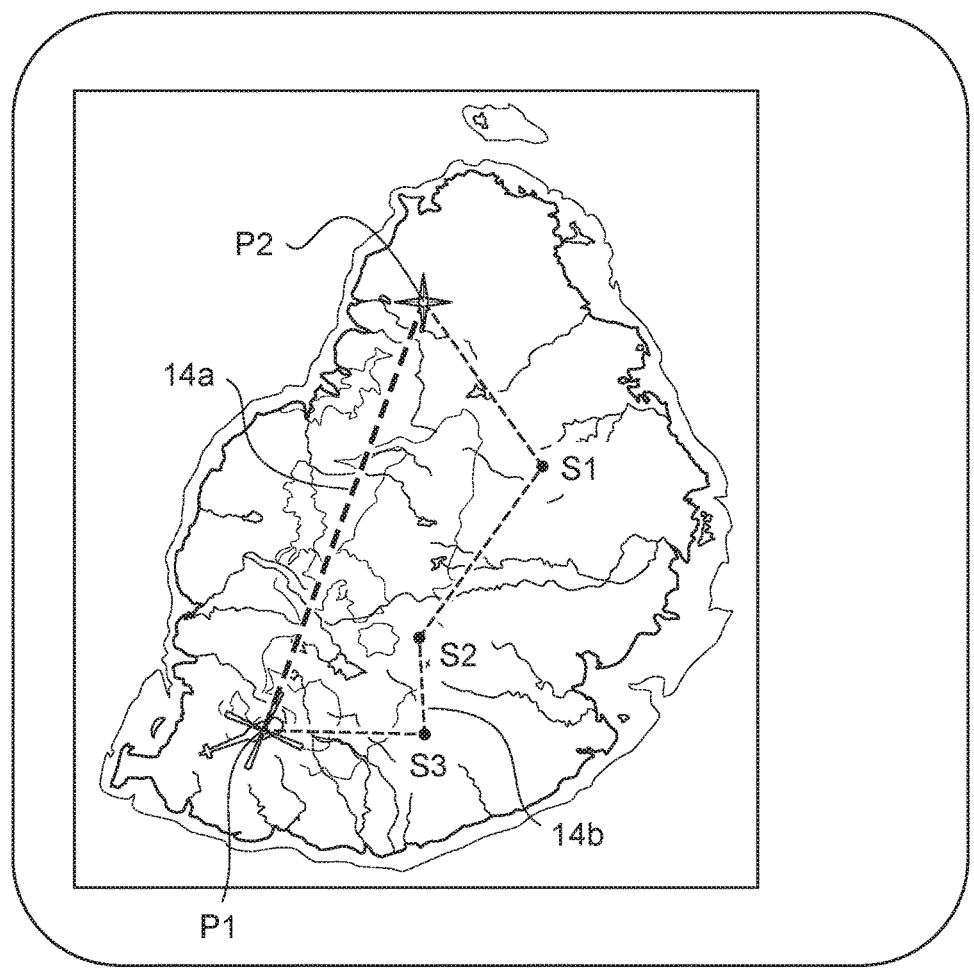
FIG. 10 is a view of the display on the display means of the aircraft.

If the strategy for choosing the type of safe path is to define at least two attachment paths 14a and 14b, then all of the defined attachment paths 14a, 14b are displayed on the display means 6, as shown in FIG. 10. This display on the display means 6 informs the pilot of the current position P1 of the aircraft 10, of the attachment point P2, and of the two defined attachment paths 14a and 14b. The first attachment path 14a is a safe attachment path in application of the "direct-to" function. The second attachment path 14b corresponds to a "Hansel-and-Gretel" flight passing successively via the passage points S3, S2, and S1.

The method then includes a sixth step 26 during which the pilot selects the attachment path to be used in order to reach the attachment point.

Finally, during an optional seventh step 27, the aircraft 10 is guided along the attachment path 14 to the attachment point P2 by an autopilot 7 of the aircraft 10. The aircraft 10 can then reach the attachment point P2 in automatic and safe manner starting from its current position P1.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of calculating a safe flight path over terrain from the current position of an aircraft to an attachment point, the method comprising the following steps:
    selecting a strategy for choosing the attachment point and for choosing the type of the safe path;
    determining the current position of the aircraft;
    defining the attachment point that is to be reached by the aircraft; and
    defining at least one attachment path connecting the current position of the aircraft to the attachment point in safe manner over the terrain;

wherein the attachment point is defined by being overflown by the aircraft, and passage points overflown by the aircraft are stored during the flight of the aircraft, and then the attachment path is defined as being a path passing via the passage points in reverse order, the current position being the last-stored passage point.

2. A method according to claim 1, wherein the passage points are stored in real time, the passage points being selected by a crew member of the aircraft.

3. A method according to claim 1, wherein the passage points are stored at regular intervals.

4. A method according to claim 1, wherein it is verified that the attachment path does not interfere with the terrain.

5. A method according to claim 1, wherein the attachment path is defined as being a path including a substantially straight and horizontal track connecting a first vertical line passing through the current position of the aircraft to a second vertical line passing through the attachment point.

6. A method according to claim 1, wherein a flight plan is prepared beforehand and an initial route is defined by the flight plan, the attachment point being defined as being situated on the initial route, and the attachment path is defined as being a path comprising a straight first segment in a direction connecting a first vertical line passing through the current position of the aircraft to a second vertical line passing through the attachment point, and a curvilinear second segment is defined joining the straight first segment to the initial route, the curvilinear second segment leaving the straight first segment while maintaining continuity between them and joining the initial route while maintaining continuity therewith.

7. A method according to claim 4, wherein the attachment path is positioned at a safe altitude.

8. A method according to claim 4, wherein the attachment path is subdivided into a plurality of horizontal tracks that are adjacent in pairs, it is verified that each track does not interfere with the terrain, and each track interfering with the terrain, if any, is corrected by being positioned at a safe altitude.

9. A method according to claim 4, wherein the attachment path is defined as being a path having a plurality of horizontal tracks that are adjacent in pairs, each track being situated at a safe altitude.

10. A method according to claim 7, wherein the safe altitude of a track is equal to a height relative to the ground corresponding to the maximum height of the terrain situated under the track plus a safety margin.

11. A method according to claim 1, wherein the attachment point is displayed together with each attachment path on display means of the aircraft.

12. A method according to claim 1, wherein only one attachment path is defined.

13. A method according to claim 1, wherein at least two attachment paths are defined and a pilot of the aircraft selects one of the attachment paths for reaching the attachment point.

14. A method according to claim 1, wherein the aircraft includes an autopilot, and the aircraft is guided along the attachment path to the attachment point in automatic manner by means of the autopilot.

15. A device for calculating a safe flight path over terrain from a current position of an aircraft to an attachment point, the device comprising:
a man-machine interface MMI;
at least one display means;
at least one locating means for locating the aircraft;
at least one "terrain" and/or obstacles database; and
at least one calculator;
wherein the device is designed to perform a method of calculating the safe flight path over terrain from the current position of an aircraft to an attachment point, the method comprising the following steps:
selecting a strategy for choosing the attachment point and for choosing the type of the safe path;
determining the current position of the aircraft
defining the attachment point that is to be reached by the aircraft and
defining at least one attachment path connecting the current position of the aircraft to the attachment point in safe manner over the terrain;
wherein the attachment point is defined by being overflown by the aircraft, and passage points overflown by the aircraft are stored during the flight of the aircraft, and then the attachment path is defined as being a path passing via the passage points in reverse order, the current position being the last-stored passage point.

16. A method of calculating a safe flight path over terrain from the current position of an aircraft to a predefined point, the method comprising:
selecting a strategy for choosing the predefined point and for choosing the type of the safe path;
determining the current position of the aircraft;
defining the predefined point to be reached by the aircraft; and
defining at least one connecting path connecting the current position of the aircraft to the predefined point in a safe manner over the terrain;
wherein the predefined point is defined by being overflown by the aircraft, and passage points overflown by the aircraft are stored during the flight of the aircraft, and then the connecting path is defined as being a path passing via the passage points in reverse order, with the current position being the last-stored passage point.

17. A method according to claim 16, wherein the passage points are stored in real time, the passage points being selected by a crew member of the aircraft.

18. A method according to claim 16, wherein the passage points are stored at regular intervals.

19. A method according to claim 16, wherein it is verified that the connecting path does not interfere with the terrain, and wherein the connecting path is defined as being a path including a substantially straight and horizontal track connecting a first vertical line passing through the current position of the aircraft to a second vertical line passing through the predefined point.

20. A method according to claim 16, wherein a flight plan is prepared beforehand and an initial route is defined by the flight plan, the attachment point being defined as being situated on the initial route, and the attachment path is defined as being a path comprising a straight first segment in a direction connecting a first vertical line passing through the current position of the aircraft to a second vertical line passing through the attachment point, and a curvilinear second segment is defined joining the straight first segment to the initial route, the curvilinear second segment leaving the straight first segment while maintaining continuity between them and joining the initial route while maintaining continuity therewith.

* * * * *